(12) United States Patent
Feng

(10) Patent No.: US 9,519,541 B2
(45) Date of Patent: Dec. 13, 2016

(54) DATA STORAGE DEVICE AND DATA CHECKING AND CORRECTION FOR VOLATILE MEMORY

(71) Applicant: VIA TECHNOLOGIES, INC., New Taipei (TW)

(72) Inventor: Lei Feng, Beijing (CN)

(73) Assignee: VIA TECHNOLOGIES, INC., New Taipei (TW)

( * ) Notice: Subject to any disclaimer, the term of this patent is extended or adjusted under 35 U.S.C. 154(b) by 135 days.

(21) Appl. No.: 14/271,813

(22) Filed: May 7, 2014

(65) Prior Publication Data

US 2015/0227424 A1  Aug. 13, 2015

(30) Foreign Application Priority Data

Feb. 8, 2014  (CN) .......................... 2014 1 0046036

(51) Int. Cl.
*G06F 11/00* (2006.01)
*G06F 11/10* (2006.01)

(52) U.S. Cl.
CPC .......... *G06F 11/108* (2013.01); *G06F 11/1048* (2013.01); *G06F 2211/109* (2013.01)

(58) Field of Classification Search
CPC .............. G06F 2211/109; G06F 11/108; G06F 11/1048
See application file for complete search history.

(56) References Cited

U.S. PATENT DOCUMENTS

| 2008/0072120 A1 | 3/2008 | Radke |
| 2009/0251988 A1* | 10/2009 | Kim ..................... G11C 7/1018 365/233.18 |
| 2013/0103917 A1 | 4/2013 | Gupta |
| 2013/0254625 A1* | 9/2013 | Vlaiko ................ G06F 11/1044 714/763 |

FOREIGN PATENT DOCUMENTS

TW  201335756  9/2013

* cited by examiner

*Primary Examiner* — Guy Lamarre
(74) *Attorney, Agent, or Firm* — McClure, Qualey & Rodack, LLP

(57) ABSTRACT

Data checking and correction for a volatile memory of a data storage device, the data storage device further including a non-volatile memory and a controller. The controller operates the non-volatile memory in accordance with requests issued from a host. The controller uses the volatile memory for temporary storage of temporary data required for operations of the non-volatile memory. The controller generates error checking and correction content for the temporary data and writes the temporary data and the error checking and correction content into the volatile memory in at least one burst length for temporary storage of the temporary data. In this manner, it is not necessary to manufacture any additional pin on the volatile memory for data checking and correction.

15 Claims, 9 Drawing Sheets

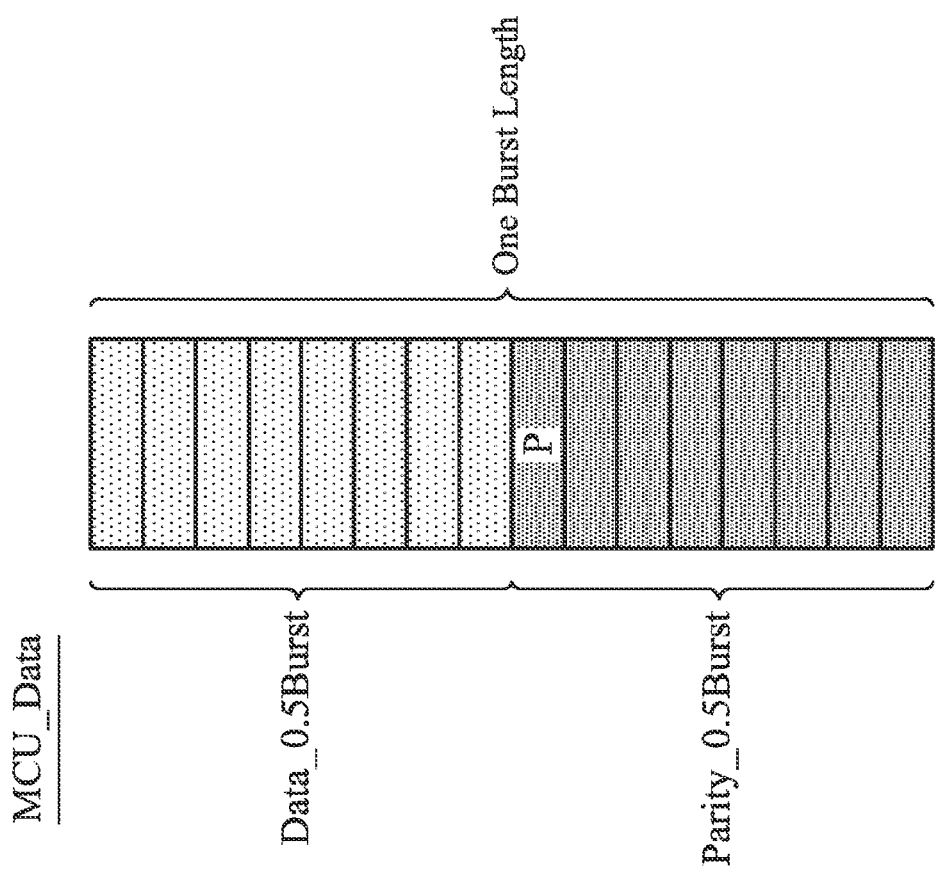

DATA STORAGE DEVICE AND DATA CHECKING AND CORRECTION FOR VOLATILE MEMORY

CROSS REFERENCE TO RELATED APPLICATIONS

This application claims priority of China Patent Application No. 201410046036.3, filed on Feb. 8, 2014, the entirety of which is incorporated by reference herein.

BACKGROUND OF THE INVENTION

Field of the Invention

The present invention relates to the data checking and correction for a volatile memory and the data checking and correction for a volatile memory within a data storage device.

Description of the Related Art

Digital data may be checked or further corrected by a data checking and correction technology. For example, an error checking and correction (ECC) algorithm and parity checking algorithm are commonly used for data checking and correction. A data checking and correction process is typically performed on digital data based on error checking and correction content previously generated and stored with the digital data. ECC code and parity, for example, are commonly used as the error checking and correction content generated for the error checking and correction processes.

For transmission of the error checking and correction content, an additional pin is required in a conventional memory technology, which results in high cost. A low-cost memory with a data checking and correction capability is called for.

Furthermore, as for a data storage device providing a non-volatile memory for user data storage, it is very complex to operate the non-volatile memory. A volatile memory is typically mounted in the data storage device for temporary data storage. A low cost data storage device having a volatile memory with a data checking and correction capability is also called for.

BRIEF SUMMARY OF THE INVENTION

A data checking and correction technology for a volatile memory and a data storage device with the data checking and correction technology are disclosed.

A data storage device in accordance with an exemplary embodiment of the disclosure comprises a non-volatile memory, a volatile memory and a controller. The controller operates the non-volatile memory in accordance with requests issued from a host. The controller uses the volatile memory for temporary storage of temporary data required for operations of the non-volatile memory. The controller generates error checking and correction content for the temporary data and writes the temporary data and the error checking and correction content into the volatile memory in format of at least one burst length for temporary storage of the temporary data. In this manner, the volatile memory has the capability of data checking and correction without adding any additional chip pin for the error checking and correction content.

In another exemplary embodiment, a data checking and correction method for a volatile memory of a data storage device is disclosed. In addition to the volatile memory, the data storage device includes a non-volatile memory. In accordance with the disclosed method, error checking and correction content corresponding to temporary data required for operations of the non-volatile memory is generated, and the temporary data and the corresponding error checking and correction content are written into the volatile memory in format of at least one burst length for temporary storage of the temporary data.

The disclosed data checking and correction technology is not intended to limit the disclosure in data storage devices. In another exemplary embodiment, a data checking and correction method for a volatile memory not limited to any particular device is disclosed. In accordance with the method, error checking and correction content for a first type of data is generated. The first type of data is in a quantity greater than a first quantity. The first type of data is written into the volatile memory in format of a plurality of burst lengths. The error checking and correction content corresponding thereto is written into the volatile memory in format of one burst length.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3B shows a data format MCU_Data for temporary storage of controller data in accordance with an exemplary embodiment of the disclosure;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
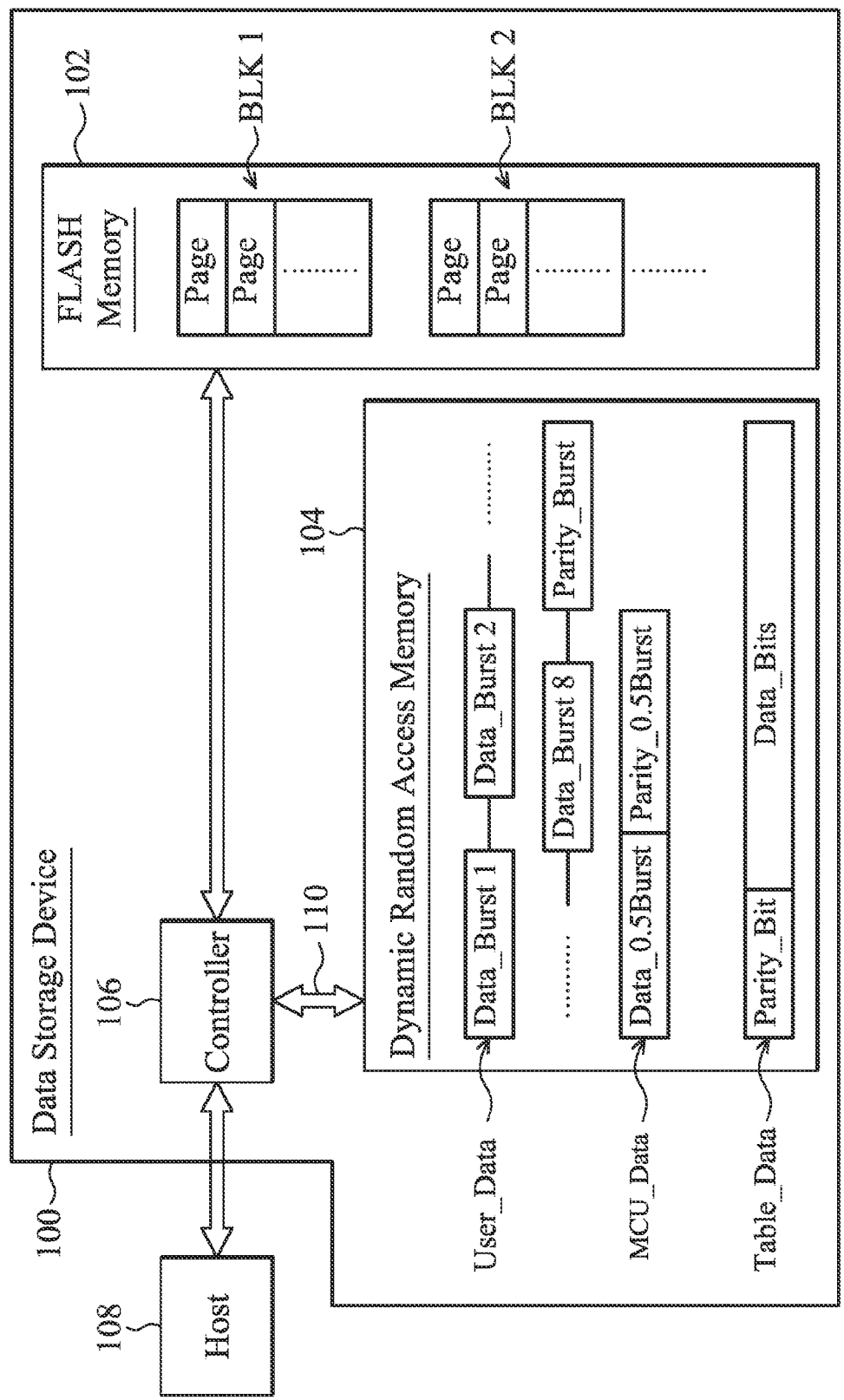
FIG. 1 depicts a data storage device 100 in accordance with an exemplary embodiment of the disclosure.

FIG. 1 depicts a data storage device 100 in accordance with an exemplary embodiment of the disclosure. The data storage device 100 comprises a non-volatile memory 102 (e.g. a FLASH memory), a volatile memory 104 (e.g. a DRAM) and a controller 106. The controller 106 operates the FLASH memory 102 in accordance with the requests issued from a host 108 and uses the DRAM 104 for temporary storage of temporary data required for operations of the FLASH memory 102.

As shown in FIG. 1, the space of the FLASH memory 102 is divided into blocks, BLK1, BLK2 and so on. Each block is further divided into pages. One important operating characteristic of the FLASH memory 102 is performing an erase operation on a block basis. To release a space for reuse, an erase operation must be performed on the entire block. Such a storage space utilization rule results in a considerable number of temporary data being temporarily stored into the DRAM 104. Thus, data checking and correction of the DRAM 104 is more important.

Under the premise of not increasing the pin number of the DRAM 104, a data checking and correction technology for the DRAM 104 is disclosed in this specification. As show in FIG. 1, the controller 106 generates error checking and correction content for the temporary data required for operating the FLASH memory 102, and writes the generated error checking and correction content and the corresponding temporary data into DRAM 104 in format of at least one burst length for temporary storage of the temporary data. The error checking and correction content may be generated according to an ECC algorithm or a parity algorithm and so on. Referring to the exemplary embodiment shown in FIG. 1, the controller 106 is coupled to the DRAM 104 via data bus 110. The burst length is M times a bus width of the data bus 110, where M is greater than or equal to 2. For example, when the DRAM 104 is a DDR3 SDRAM (Double-Data-Rate Three Synchronous Dynamic Random Access Memory), the burst length is defined as 16 bytes in the specification (e.g. JESD79-3E) of DDR3 SDRAM. In this example, the DRAM 104 has 16 data pins, that is, the bus width of the data bus 110 is 16 bits. Thus two bytes (i.e. 16 bits) of temporary data are synchronously read/written in parallel.

Three types of temporary data (temporarily stored by the DRAM 104) are discussed below.

The first type of temporary data is user data, which is issued from the host 108 and expected to be stored by the FLASH memory 102. Before being stored into the FLASH memory 102, the user data has to be written into the DRAM 104 for temporary storage and thereby processed by the controller 106. After the data processing, the user data is moved from the DRAM 104 to the FLASH memory 102. There is a fairly large amount of user data.

The second type of temporary data is controller data, which are generated by the controller 106 when the controller 106 reads/writes the FLASH memory 102. For example, temporary data is generated by the controller 106 during a garbage collection or a physical address calculation process or other operations. The quantity of controller data is lower than the user data.

The third type of temporary data is mapping-table data, which includes logical-to-physical address mapping information between the host 108 and the FLASH memory 102. The quantity of the mapping-table data is lower than the controller data.

The controller 106 may write the different types of temporary data and the corresponding error checking and correction content into the DRAM 104 in different data formats, dependent on the data attribution of the temporary data.

As shown in FIG. 1, the controller 106 writes user data and the corresponding error checking and correction content into the DRAM 104 in a data format User_Data, for temporary storage of user data. In this exemplary embodiment, the host 108 accesses user data on a sector basis. A sector, for example, is 512 bytes. In the FLASH memory 102, for example, each block is 128 bytes. Thus, the host 108 accesses at least 4 blocks of user data in each read/write operation, wherein each block of user data is transmitted in format of 8 burst lengths. As shown in FIG. 1, for burst lengths of user data Data_Burst1, Data_Burst2 . . . Data_Burst8, one burst length of error checking and correction content Parity_Burst is generated to be written into the DRAM 104 with the temporary storage of the burst lengths of user data Data_Burst1, Data_Burst2 . . . Data_Burst8. For a DRAM with 16 data pins, 16 bytes of data are transmitted in each burst length. For a DRAM with 32 data pins, 32 bytes of data are transmitted in each burst length. The controller 106 generates one error checking and correction word for each burst length of user data (e.g., separately generated for Data_Burst1, Data_Burst2 . . . Data_Burst8) and combines the error checking and correction words of the burst lengths of user data Data_Burst1, Data_Burst2 . . . Data_Burst8 to form one burst length of error checking and correction content Parity_Burst. After the burst lengths of user data Data_Burst1, Data_Burst2 . . . Data_Burst8 are written into DRAM 104 for temporary storage, the controller 106 further writes the burst length of error checking and correction content Parity_Burst into the DRAM 104.

As for controller data required for calculations required during operations of the non-volatile memory, the controller 106 writes the controller data and the corresponding error checking and correction content into the DRAM 104 in a data format MCU_Data for temporary storage of the controller data. According to the data format MCU_Data, half-burst-length controller data Data_0.5Burst is transmitted into the DRAM 104 along with the corresponding error checking and correction content contained in a space Parity_0.5Burst. The size of the space Parity_0.5Burst is half the burst length. The error checking and correction content contained in the half-burst-length space Parity_0.5Burst is generated by the controller 106 based on the half-burst-length controller data Data_0.5Burst.

In some exemplary embodiments, the controller 106 writes mapping-table data and the corresponding error checking and correction content into the DRAM 104 in a data format Table_Data for temporary storage of the mapping-table data. According to the data format Table_Data, (N−1) bits of mapping-table data Data_Bits is transmitted into the DRAM 104 with one error checking and correction parity bit Parity_Bit. The error checking and correction parity bit Parity_Bit is generated by the controller 106 based on the (N−1) bits of mapping-table data Data_Bits.

According to the aforementioned design, the DRAM 104 does not need any additional chip pin for the data checking and correction capability. The different types of temporary data (e.g. classified according to quantity) and corresponding error checking and correction content are properly written into the DRAM 104 for temporary storage by the corresponding data formats.

Figure 2:
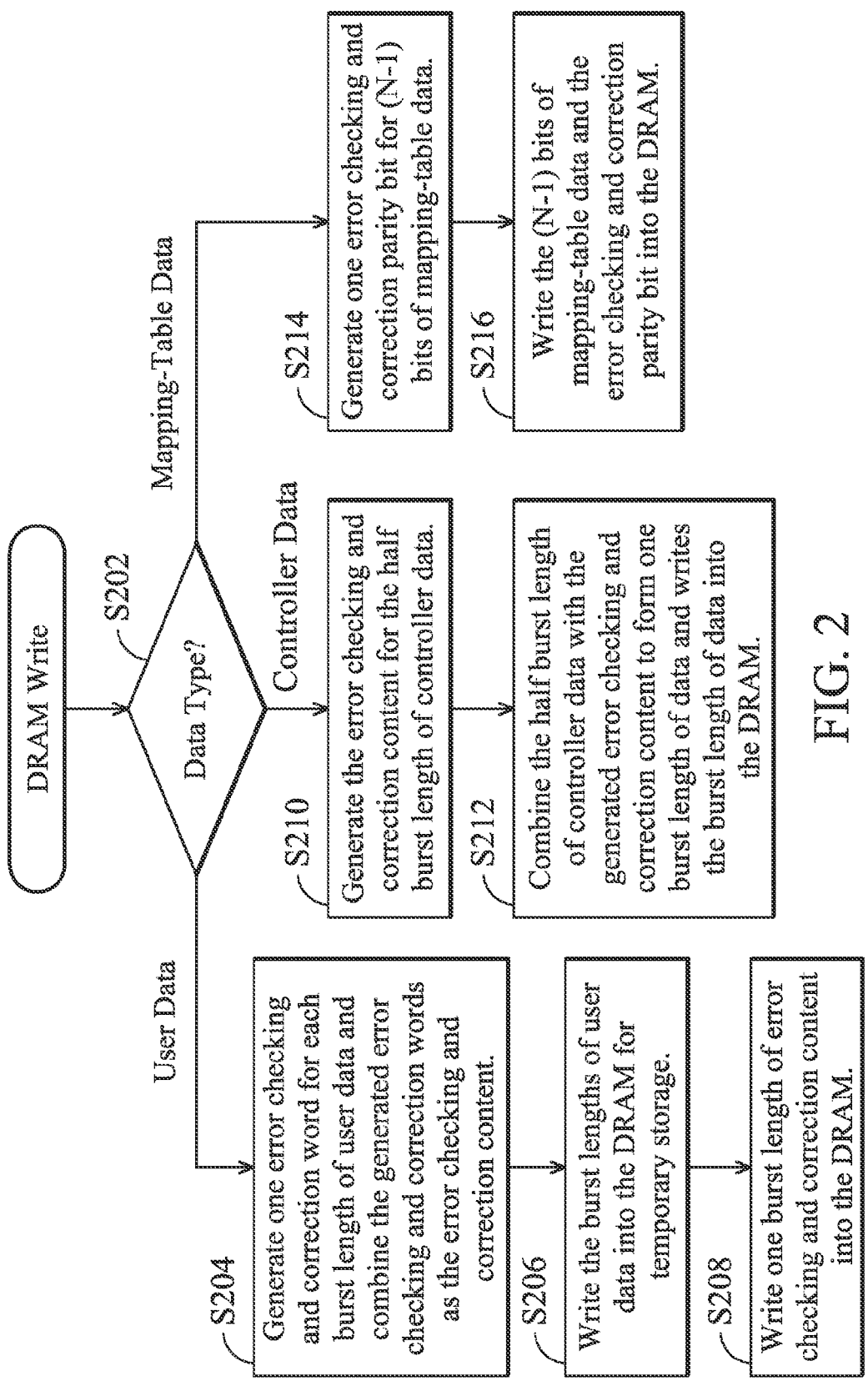
FIG. 2 is a flow chart depicting a write operation for a volatile memory (e.g. DRAM 104)

FIG. 2 is a flow chart depicting a write operation of a volatile memory, which is discussed with respect to FIG. 1. In step S202, the controller 106 determines the data type, to write the different types of data in the different ways. It is not intended to limit any data type to any data checking and correction technology or any data transmission format. However, it clearly shows how the access efficiency of a volatile memory is improved when the different error checking and correction technologies are performed on the different types of temporary data. Note that step S202 is an optional step. The user may select the write operation of steps S204 to S208, the write operation of steps S210 to S212 or the write operation of steps S214 to S216 as a general solution regardless the type of temporary data.

In FIG. 2, when writing user data into the DRAM 104 for temporary storage, the controller 106 performs step S204 to generate one error checking and correction word for each burst length of user data (each of Data_Burst1, Data_Burst2 . . . Data_Burst8) and combines the generated error checking and correction words as the error checking and correction content. In step S206, the controller 106 writes the user data in format of a plurality of burst lengths (i.e., Data_Burst1, Data_Burst2 up to Dara_Burst8) into the DRAM 104 for temporary storage. After step S206, step S208 is performed by the controller 106, which writes error checking and correction content in format of one burst length (i.e., Parity_Burst) into the DRAM 104. As shown, the controller 106 writes the user data Data_Burst1, Data_Burst2 up to Dara_Burst8 and the corresponding error checking and correction content Parity_Burst into the DRAM 104 in format of burst lengths. For each burst length of user data, one error checking and correction word is generated. Note that the error checking and correction words corresponding to the user data Data_Burst1, Data_Burst2 up to Dara_Burst8 are written into the DRAM 104 in format of one burst length after the user data Data_Burst1, Data_Burst2 up to Dara_Burst8 are written into the DRAM 104 for temporary storage in format of burst lengths. The error checking and correction words must be written into the DRAM 104 after the user data is written into the DRAM 104, in a case that the error checking and correction words are generated firstly, the error checking and correction words need to be temporarily stored by the registers of the controller 106 and then collected as the error checking and correction content. The order of steps S204 and S206 may be changed depending on user preference.

When writing controller data into the DRAM 104 for temporary storage, the controller 106 performs step S210 to generate the error checking and correction content for the half burst length of controller data Data_0.5Burst. After step S210, the controller 106 performs step S212 to combine the half burst length of controller data Data_0.5Burst with the generated error checking and correction content to form one burst length of data and writes the burst length of data (containing Data_0.5Burst and Parity_0.5Burst) into the DRAM 104 in a data format MCU_Data.

When writing mapping-table data into the DRAM 104 for temporary storage, the controller 106 performs step S214 to generate one error checking and correction parity bit Parity_Bit for (N−1) bits of mapping-table data Data_Bits. After step S214, the controller 106 performs step S216 to write the (N−1) bits of mapping-table data Data_Bits and the error checking and correction parity bit Parity_Bit into the DRAM 104 in a data format Table_Data.

Figure 3A:
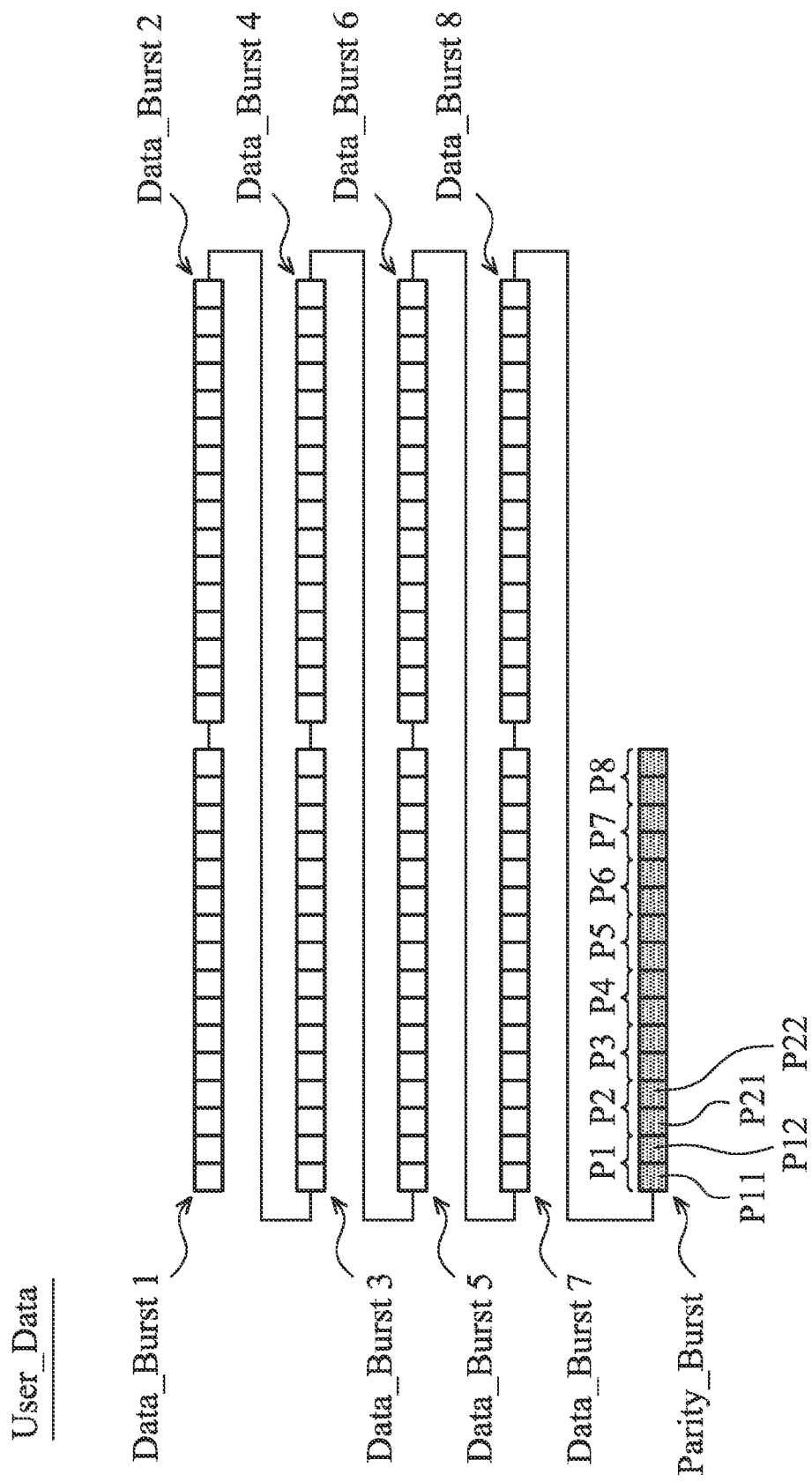
FIG. 3A shows a data format User_Data for temporary storage of user data in accordance with an exemplary embodiment of the disclosure.

FIG. 3A shows the data format User_Data in detail, for temporary storage of user data in accordance with an exemplary embodiment of the disclosure. In this exemplary embodiment, one burst length is 16 bytes, and user data issued from the host 108 and expected to be written into one block of the FLASH memory 102 is 128 bytes. The block of user data is written into the DRAM 104 in 8 burst lengths, in a sequence from Data_Burst1 to Data_Burst8. After the 8 burst lengths of user data DataBurst1 . . . Data_Burst8, the burst length of error checking and correction content Parity_Burst is written into the DRAM 104. The burst length of error checking and correction content Parity_Burst contains 8 error checking and correction words P1 . . . P8, respectively corresponding to the 8 burst lengths of user data Data_Burst1 . . . Data_Burst8. In the error checking and correction word P1, the byte P11 is generated from the first half burst length of the user data DataBurst1 (e.g., the first 8 bytes of Data_Burst1) and the byte P12 is generated from the last half burst length of the user data Data_Burst1 (e.g., the last 8 bytes of Data_Burst1). In the error checking and correction word P2, the byte P21 is generated from the first half burst length of the user data Data_Burst2 (e.g., the first 8 bytes of Data_Burst2) and the byte P22 is generated from the last half burst length of the user data Data_Burst2 (e.g., the last 8 bytes of Data_Burst2). The remaining may be deduced by analogy.

FIG. 3B shows the data format MCU_Data in detail, for temporary storage of controller data in accordance with an exemplary embodiment of the disclosure. In this exemplary embodiment, one burst length is 16 bytes. Generally, quantity of controller data is much smaller user data. It is ok to store 8 bytes of controller data Data_0.5Burst and the corresponding error checking and correction content P into the DRAM 104 in a single burst length. In an exemplary embodiment, a space Parity_0.5Burst of half the burst length is allocated for the storage of the error checking and correction content P. As shown, P is 1 byte and is stored with the controller data Data_0.5Burst in a data format of one burst length.

Figure 3C:
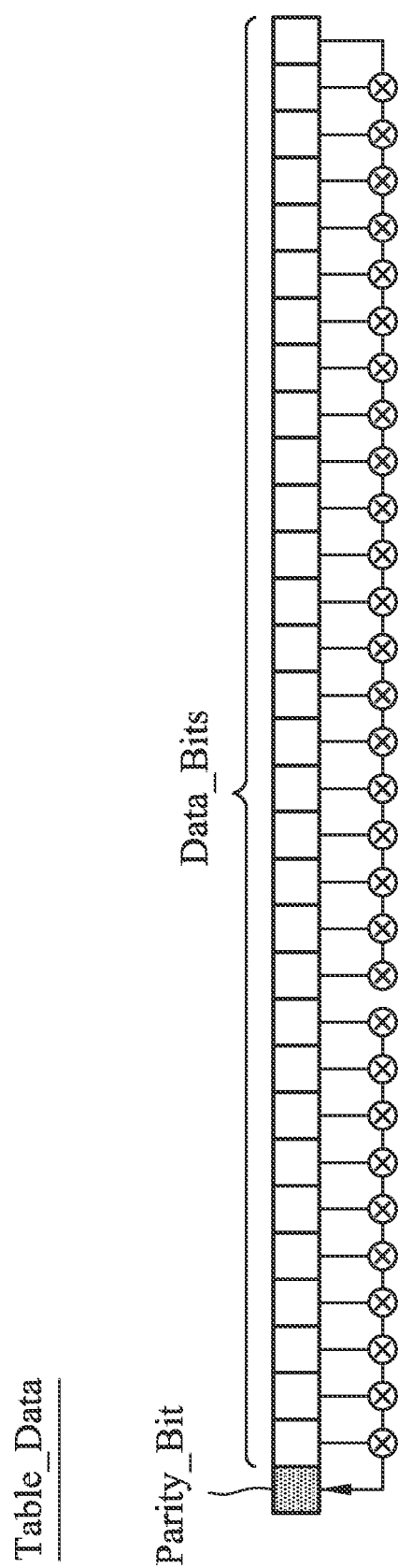
FIG. 3C shows a data format Table_Data for temporary storage of mapping-table data in accordance with an exemplary embodiment of the disclosure.

FIG. 3C shows the data format Table_Data in detail, for temporary storage of mapping-table data in accordance with an exemplary embodiment of the disclosure. In this exemplary embodiment, N is 32. An XOR calculation is performed on the 31 bits of mapping-table data Data_Bits to generate one error checking and correction bit Parity_Bit.

Figure 4:
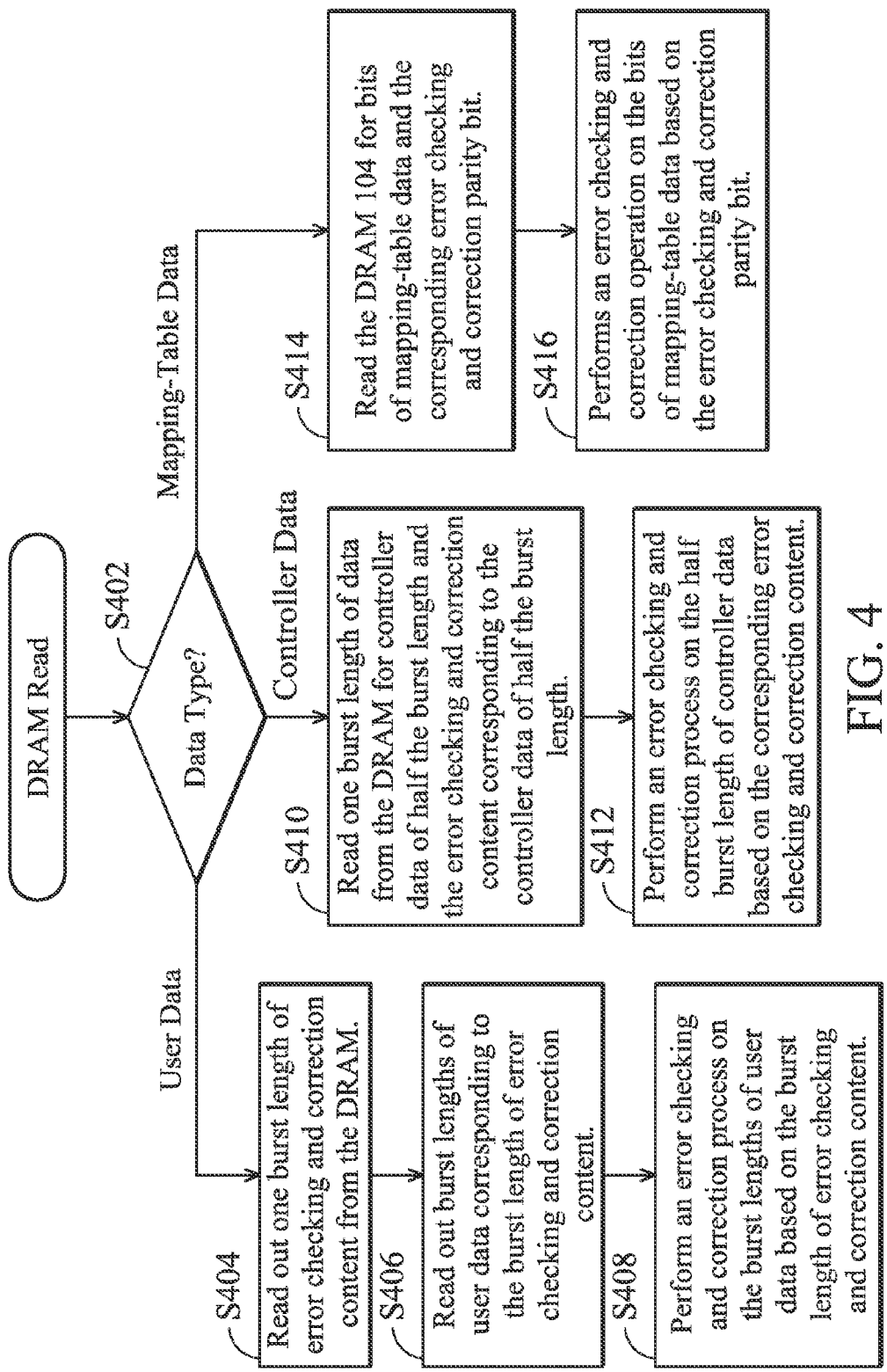
FIG. 4 is a flow chart depicting a read operation for a volatile memory (e.g. DRAM 104)

FIG. 4 is a flowchart depicting a read operation of a volatile memory, which is discussed with respect to FIG. 1. In step S402, the controller 106 determines the data type to be read, to read the different types of data in different ways. As that discussed in FIG. 2, it is not intended to limit any data type to be checked and corrected by any particular error checking and correction process or to be read by any particular method. The temporary data should be checked and corrected based on the error checking and correction technology adopted during the write process. Step S402 is an optional step. The user may select the read operation of steps S404 to S408, the read operation of steps S410 to S412 or the read operation of steps S414 to S416 as a general solution regardless the type of temporary data. That is to say, the read operation of steps S404 to S408, the read operation of steps S410 to S412 and the read operation of steps S414 to S416 could respectively be three independent embodiments to read all the types of temporary data from the DRAM 104.

When it is determined in step S402 that the data to be read is user data, the controller 106 performs step S404 to read out one burst length of error checking and correction content Parity_Burst from the DRAM 104. After step S404, step S406 is performed to read out 8 burst lengths of user data Data_Burst1, Data_Burst2 . . . Data_Burst8 corresponding to the burst length of error checking and correction content Parity_Burst. The controller 106 then performs step S408, by which an error checking and correction process is performed on the 8 burst lengths of user data Data_Burst1, Data_Burst2 . . . Data_Burst8 based on the burst length of error checking and correction content Parity_Burst.

When it is determined in step S402 that the data to be read is controller data, the controller 106 performs step S410 to read one burst length of data MCU_Data from the DRAM 104, wherein the burst length of data MCU_Data contains the half burst length of controller data Data_0.5Burst and the corresponding error checking and correction content P (retrieved from the half burst length of space Parity_0.5Burst). After step S412, the controller 106 performs step S412, by which an error checking and correction process is performed on the half burst length of controller data Data_0.5Burst based on the corresponding error checking and correction content P.

When it is determined in step S402 that the data to be read is mapping-table data, the controller 106 performs step S414 to read N bits from the DRAM 104, including (N−1) bits of mapping-table data Data_Bits temporarily stored in the DRAM 104 and the corresponding error checking and correction parity bit Parity_Bit. In step S416, the controller 106 performs an error checking and correction operation on the (N−1) bits of mapping-table data Data_Bits based on the error checking and correction parity bit Parity_Bit.

Figure 5A:
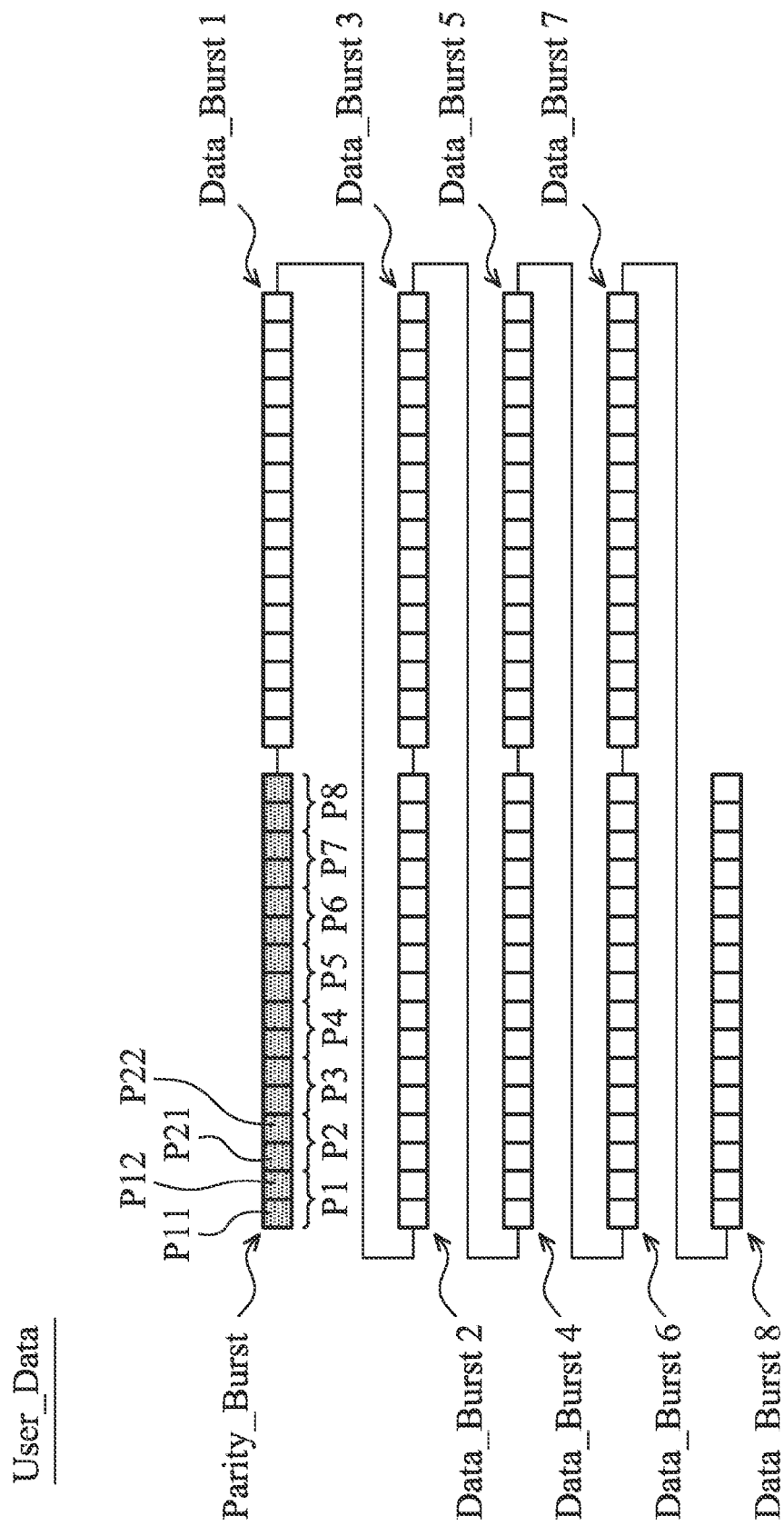
FIG. 5A shows the error checking and correction of data temporarily stored in the data format User_Data.

FIG. 5A shows the error checking and correction for data temporarily stored in the data format User_Data. As shown, in a read operation of the DRAM 104, a burst length of error checking and correction content Parity_Burst is read out before the 8 burst lengths of user data Data_Burst1, Data_Burst2 up to Data_Burst8 are read out. The error checking and correction content Parity_Burst comprises 8 error checking and correction words P1 to P8 corresponding to the 8 burst lengths of user data Data_Burst1 to Data_Burst8, respectively. The byte P11 of the error checking and correction word P1 is retrieved for the error checking and correction of the first half burst length of the user data Data_Burst1 (e.g., the first 8 bytes of Data_Burst1), to get the error checked and corrected user data. The byte P12 of the error checking and correction word P1 is retrieved for the error checking and correction of the last half burst length of the user data Data_Burst1 (e.g., the last 8 bytes of Data_Burst1), to get the error checked and corrected user data. The byte P21 of the error checking and correction word P2 is retrieved for the error checking and correction of the first half burst length of the user data Data_Burst2 (e.g., the first 8 bytes of Data_Burst2), to get the error checked and corrected user data. The byte P22 of the error checking and correction word P2 is retrieved for the error checking and correction of the last half burst length of the user data Data_Burst2 (e.g., the last 8 bytes of Data_Burst2), to get the error checked and corrected user data. The remaining may be deduced by analogy.

Figure 5B:
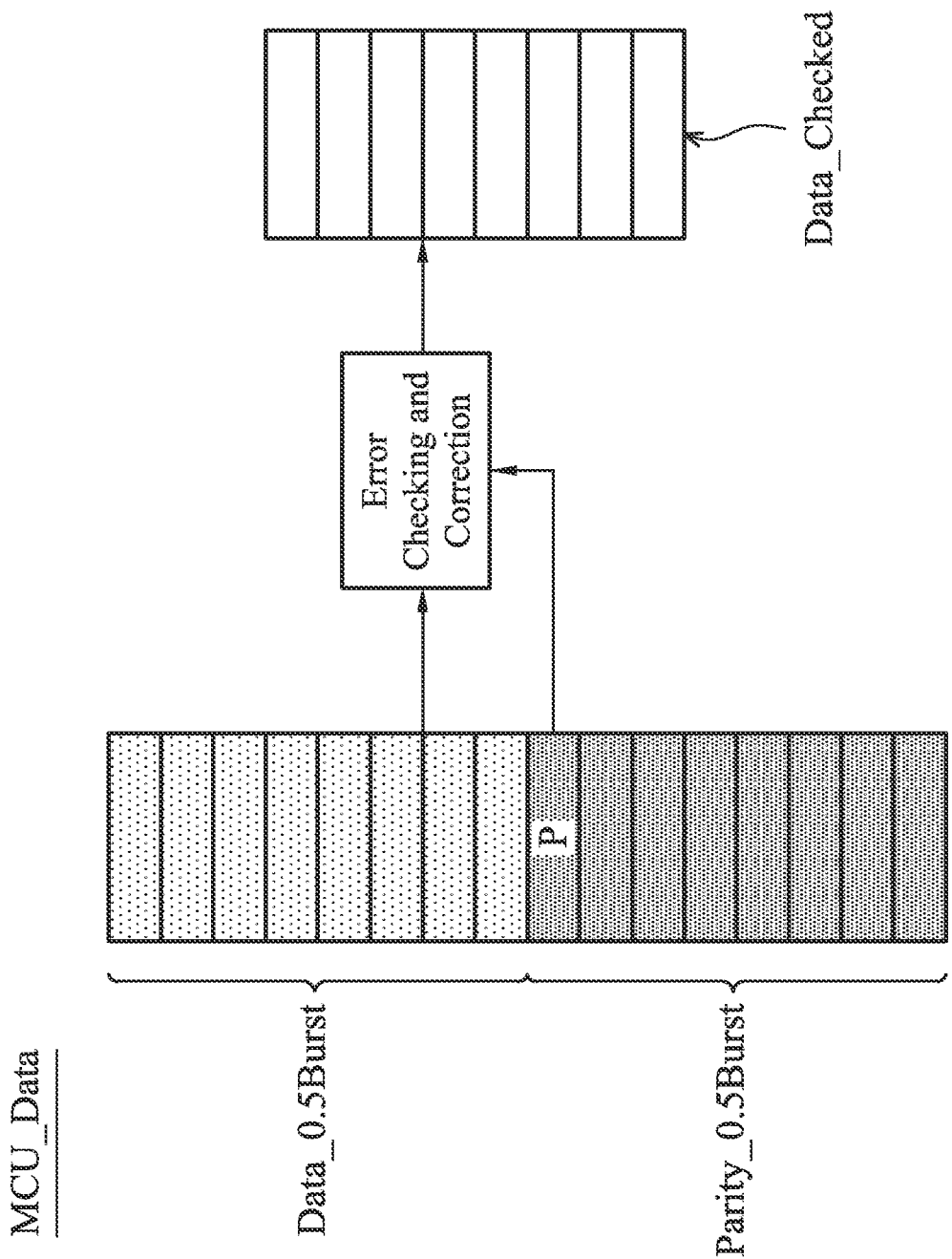
FIG. 5B shows the error checking and correction of data temporarily stored in the data format MCU_Data.

FIG. 5B shows how the error checking and correction of data temporarily stored in the data format MCU_Data. As shown, controller data Data_0.5Burst of half the burst length is checked and corrected by the error checking and correction content P contained in space of another half burst length Parity_0.5Burst and thereby the error checked and corrected controller data Data_Checked is obtained.

Figure 5C:
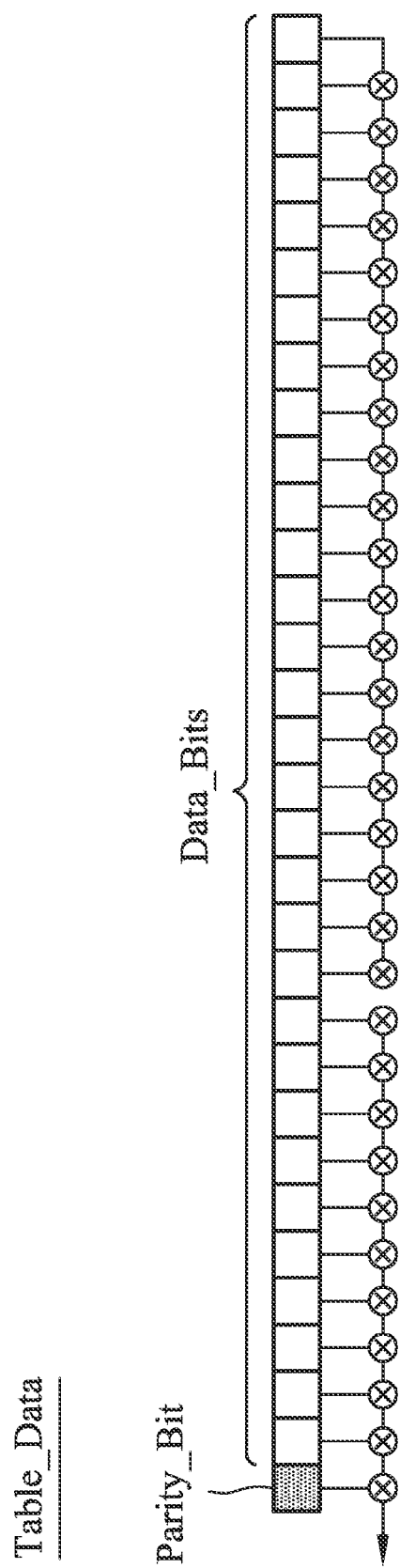
FIG. 5C shows the error checking and correction for data temporarily stored in the data format Table_Data.

FIG. 5C shows the error checking and correction of data temporarily stored in the data format Table_Data. In this exemplary embodiment, N is 32. The 31 bits of mapping-table data Data_Bits are checked by an XOR operation performed on the one bit of error checking and correction parity Parity_Bit and the 31 bits of mapping-table data Data_Bits. A flag may be provided to show whether the 31 bits of mapping-table data Data_Bits is correct.

It is to be noted that non-volatile memory 102 and volatile memory 104 of data storage device 100 of the invention are not limited to a FLASH memory and a DRAM respectively. And the data checking and correction technology for a volatile memory of the invention is not limited to be implemented in a data storage device. Any electrical apparatus with a volatile memory could use the data checking and correction technology disclosed herein.

Any data checking and correction technology for a volatile memory and operated based the data format User_Data and/or MCU_Data and/or Table_Data is within the scope of the invention.

In an exemplary embodiment, the data format for the data checking and correction of a volatile memory depends on the quantity of the temporary data. For a first type of data in a quantity greater than a first quantity, the error checking and correction technology is based on the data format User_Data. For a second type of data in a quantity less than the first quantity but greater than a second quantity, the error checking and correction technology is based on the data format MCU_Data. For a third type of data in a quantity less than the second quantity, the error checking and correction technology is based on the data format Table_Data.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory;
a volatile memory; and
a controller, operating the non-volatile memory in accordance with requests issued from a host and using the volatile memory for temporary storage of temporary data for operations of the non-volatile memory,
wherein:
the controller generates error checking and correction content for the temporary data and writes the temporary data and the error checking and correction content into the volatile memory in format of at least one burst length for temporary storage of the temporary data,
wherein the controller writes the temporary data into the volatile memory for temporary storage in format of a plurality of burst lengths;
the controller generates one error checking and correction word for each burst length of temporary data and combines the generated error checking and correction words to form the error checking and correction content; and
the controller writes the error checking and correction content into the volatile memory in format of one burst length after writing the temporary data into the volatile memory for temporary storage in format of the plurality of burst lengths.

2. The data storage device as claimed in claim 1, wherein the controller is coupled to the volatile memory via a data bus and the burst length is M times a bus width of the data bus, and M is larger than or equal to 2.

3. The data storage device as claimed in claim 1, wherein the controller is coupled to the volatile memory via a data bus and the burst length is 16 bytes while a bus width of the data bus is 16 bits.

4. The data storage device as claimed in claim 1, wherein:
the controller generates error checking and correction content corresponding to controller data of half the burst length and writes the controller data of half the burst length and the corresponding error checking and correction content into the volatile memory in format of one burst length for temporary storage of the controller data of half the burst length, wherein the controller data is for calculations which are required when the non-volatile memory is operated by the host.

5. The data storage device as claimed in claim 4, wherein:
the controller reads one burst length of data from the volatile memory which contains the controller data of half the burst length and the error checking and correction content corresponding to the controller data of half the burst length; and
the controller performs an error checking and correction process on the controller data of half the burst length based on the corresponding error checking and correction content.

6. The data storage device as claimed in claim 1, wherein:
the controller further generates one error checking and correction parity bit for (N−1) bits of mapping-table data and writes the (N−1) bits of mapping-table data and the error checking and correction parity bit into the volatile memory for temporary storage of the (N−1) bits of mapping-table data.

7. The data storage device as claimed in claim 6, wherein:
the controller further reads the error checking and correction parity bit and the corresponding (N−1) bits of mapping-table data from the volatile memory and performs an error checking and correction process on the (N−1) bits of mapping-table data based on the error checking and correction parity bit.

8. The data storage device as claimed in claim 1, wherein:
after reading one burst length of error checking and correction content from the volatile memory, the controller further reads the volatile memory for burst lengths of user data temporarily stored in the volatile memory and corresponding to the burst length of error checking and correction content and performs an error checking and correction process on the burst lengths of user data based on the burst length of error checking and correction content.

9. A data error checking and correction method for a volatile memory of a data storage device, comprising:
generating error checking and correction content for temporary data required for operations of a non-volatile memory of the data storage device; and
writing the temporary data and the error checking and correction content into the volatile memory in format of at least one burst length for temporary storage of the temporary data,
wherein:
one error checking and correction word is generated for each burst length of temporary data and the generated error checking and correction words are combined to form the error checking and correction content;
the temporary data is written into the volatile memory for temporary storage in format of a plurality of burst lengths; and
the error checking and correction content is written into the volatile memory in format of one burst length after the temporary data is written into the volatile memory for temporary storage in format of the plurality of burst lengths.

10. The data error checking and correction method as claimed in claim 9, wherein the burst length is M times a bus width of a data bus of the volatile memory, and M is larger than or equal to 2.

11. The data error checking and correction method as claimed in claim 9, wherein:
error checking and correction content corresponding to controller data of half the burst length is generated and combined with the controller data of half the burst length to form one burst length of data to be written into the volatile memory for temporary storage of the controller data of half the burst length,
wherein the controller data is for calculations which are required when the non-volatile memory is operated by the host.

12. The data error checking and correction method as claimed in claim 11, further comprising:
reading one burst length of data from the volatile memory which contains the controller data of half the burst length and the error checking and correction content corresponding to the controller data of half the burst length; and
performing an error checking and correction process on the controller data of half the burst length based on the corresponding error checking and correction content.

13. The data error checking and correction method as claimed in claim 9, further comprising:
generating one error checking and correction parity bit for (N−1) bits of mapping-table data; and
writing the (N−1) bits of mapping-table data and the error checking and correction parity bit into the volatile memory for temporary storage of the (N−1) bits of mapping-table data.

14. The data error checking and correction method as claimed in claim 13, further comprising:
reading the error checking and correction parity bit and the corresponding (N−1) bits of mapping-table data from the volatile memory and performing an error checking and correction process on the (N−1) bits of mapping-table data based on the error checking and correction parity bit.

15. The data error checking and correction method as claimed in claim 9, further comprising:
after reading one burst length of error checking and correction content from the volatile memory, further reading the volatile memory for burst lengths of user data temporarily stored in the volatile memory and corresponding to the burst length of error checking and correction content and performing an error checking and correction process on the burst lengths of user data based on the burst length of error checking and correction content.

* * * * *